United States Patent
Yoshida

(10) Patent No.: US 7,965,407 B2
(45) Date of Patent: Jun. 21, 2011

(54) PRINTING APPARATUS AND METHOD FOR CONTROLLING A PRINTING PROCESS

(75) Inventor: Shigetaka Yoshida, Komaki (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 729 days.

(21) Appl. No.: 12/053,041

(22) Filed: Mar. 21, 2008

(65) Prior Publication Data
US 2008/0239400 A1    Oct. 2, 2008

(30) Foreign Application Priority Data

Mar. 26, 2007  (JP) ................ 2007-079131

(51) Int. Cl.
G06K 15/00 (2006.01)
G06F 3/12 (2006.01)

(52) U.S. Cl. ....... 358/1.16; 358/1.9; 358/1.13; 358/1.15

(58) Field of Classification Search ........ 358/1.16, 358/1.17, 1.9, 3.01, 1.1, 1.2, 1.15, 1.14, 1.13, 358/1.18, 500, 501, 504, 523, 400, 401, 404, 358/406, 407, 437, 444, 462, 464, 468; 347/2, 347/3, 5, 14, 23; 399/1, 8, 9, 10, 11, 38, 399/39; 710/52, 53, 54, 72, 74; 711/106, 711/165, 158, 155

See application file for complete search history.

(56) References Cited

U.S. PATENT DOCUMENTS 6,751,425 B2   6/2004  Fujimori et al.
2005/0190407 A1  9/2005  Yokoyama

FOREIGN PATENT DOCUMENTS

| JP | 10-173842 A | 6/1998 |
|---|---|---|
| JP | 2000-324279 A | 11/2000 |
| JP | 2002-196919 A | 7/2002 |
| JP | 2002-312266 A | 10/2002 |
| JP | 2003-156968 A | 5/2003 |
| JP | 2003-345190 A | 12/2003 |
| JP | 2004-054143 A | 2/2004 |
| JP | 2005-181534 A | 7/2005 |
| JP | 2005-244829 A | 9/2005 |
| JP | 2007-065377 A | 3/2007 |

OTHER PUBLICATIONS

JP Office Action dated Mar. 5, 2009, JP Appln. 2007-079131, partial English translation.

Primary Examiner — Dov Popovici
(74) Attorney, Agent, or Firm — Banner & Witcoff, Ltd.

(57) ABSTRACT

A printing apparatus includes a memory configured to store print jobs, a printing device configured to print an image based on each of the print jobs, a detector configured to determine when it is time to execute calibration to correct a printing characteristic of the printing device, and a controller. The controller is configured to cause the printing device to print each monochrome print job stored in the memory prior to each color print job stored in the memory when the detector determines that it is time to execute the calibration. Also, the controller is configured to execute the calibration when the detector determines that it is time to execute the calibration, and to cause the printing device to print each color print job stored in the memory after executing the calibration.

13 Claims, 6 Drawing Sheets

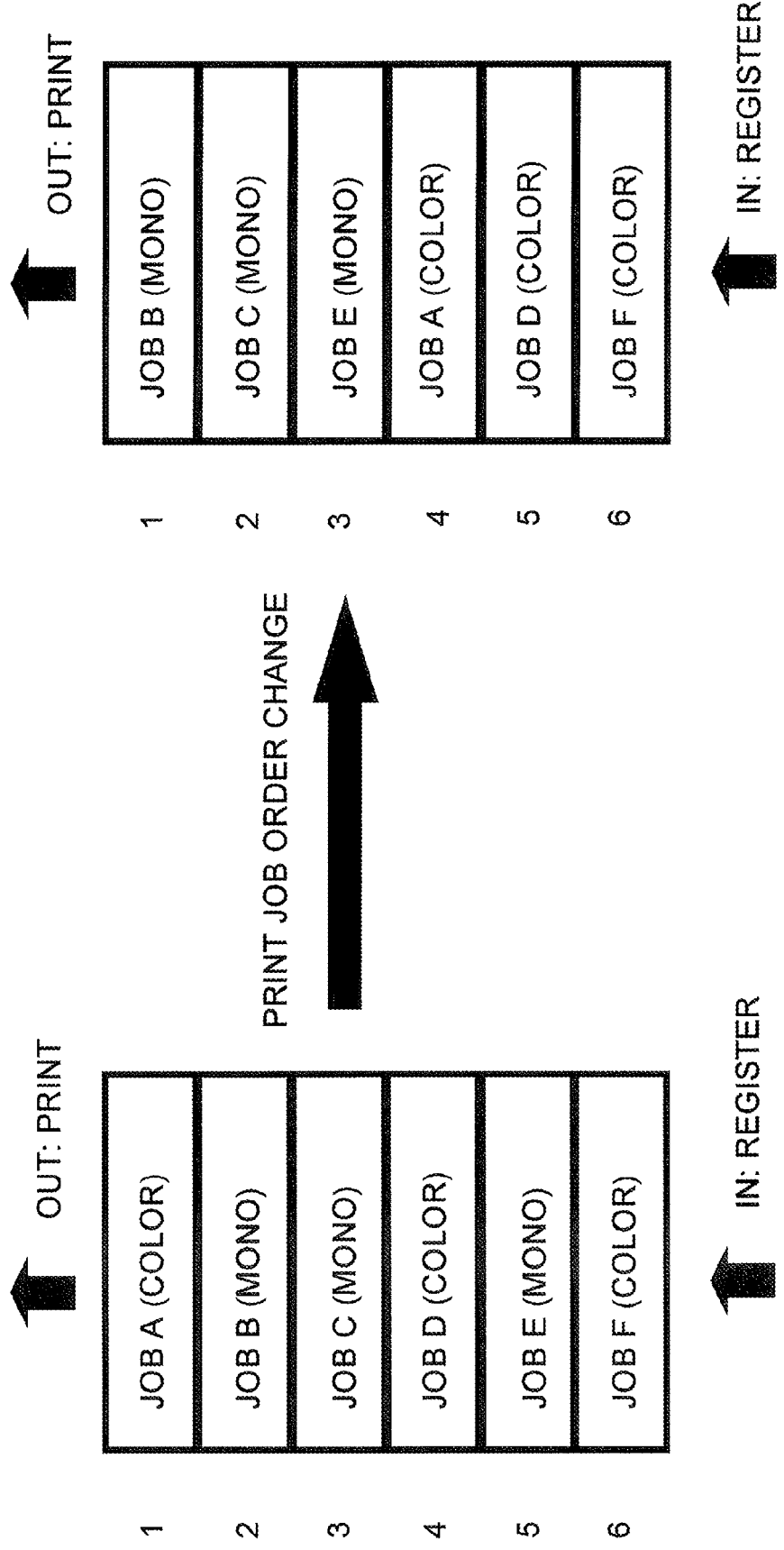

PRINTING APPARATUS AND METHOD FOR CONTROLLING A PRINTING PROCESS

CROSS REFERENCE TO RELATED APPLICATION

This application claims priority from Japanese Patent Application No. 2007-0791131, filed on Mar. 26, 2007, the entire subject matter of which is incorporated herein by reference.

FIELD

Aspects of the invention relate to printing apparatuses executing calibration to secure print image quality.

BACKGROUND

Known printing apparatuses, e.g., electrophotographic printers, execute a process designated as calibration to prevent degradation of image quality to result in printing due to environmental changes and consumption of components. In the calibration process, a toner image of a test pattern of each color is printed on a surface of an intermediate transfer belt, a position and toner density of the test pattern of each color are measured, and a color shift correction and a density adjustment are made for each color based on the measured results. The calibration process is executed automatically when it is determined that it is time to execute calibration, for example, after the expiration of a predetermined time interval from a previous calibration process.

The calibration process influences print quality during color printing more than during monochrome printing. However, if the calibration is started when print jobs are registered in a print queue, a monochrome print job, having a lower need for calibration when compared with a color print job, has to wait to start printing until after the calibration has been executed.

SUMMARY

Aspects of the invention provide a printing apparatus configured to avoid generating a waiting time due to calibration for a monochrome print job and to secure the print quality for a color print job.

BRIEF DESCRIPTION OF THE DRAWINGS

Illustrative aspects of the invention will be described in detail with reference to the following figures in which like elements are labeled with like numbers and in which:

FIG. 6 illustrates a print job order change according to an illustrative aspect.

DETAILED DESCRIPTION

An illustrative embodiment of the invention will be described in detail with reference to FIGS. 1-6. A printing apparatus according to aspects of the invention is applied to a color printer 1. It will be appreciated that aspects of the invention apply to other types of printing apparatuses as well.

Figure 1:
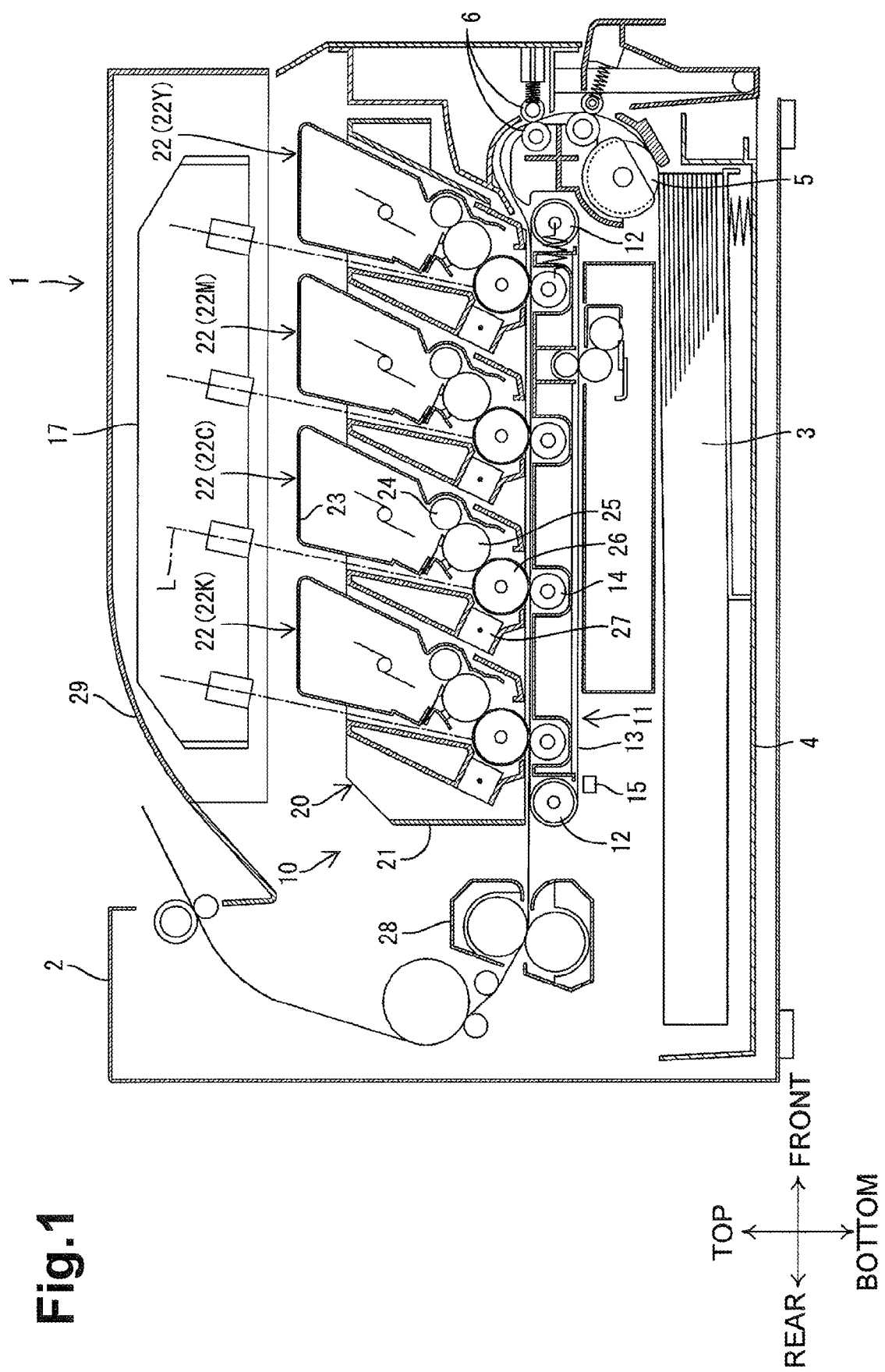
FIG. 1 is a side sectional view of a general structure of a printer according to an illustrative embodiment of the invention.

In the following description, the right side of FIG. 1 is referred to as the front of the printer 1.

A general structure of the printer 1 will be described. As shown in FIG. 1, the printer 1 includes a body casing 2. A sheet supply tray 4 for placing a stack of recording sheets 3 is disposed on a bottom portion of the body casing 2. A sheet supply roller 5 is disposed in an upper front portion of the sheet supply tray 4. An uppermost sheet in the sheet supply tray 4 is fed in conjunction with the rotation of the sheet supply roller 5 to registration rollers 6. The registration rollers 6 are configured to correct the skewing of the recording sheet 3 and then feed the sheet to a printing unit 10.

The printing unit 10 includes a belt unit 11, a scanner unit 17, a process unit 20, and a fixing unit 28.

The belt unit 11 includes a pair of support rollers 12 disposed on the front and rear, and a belt 13 extended between the support rollers 12. The belt 13 can be made of polycarbonate material. When the belt 13 is driven, the recording sheet 3 is fed rearward on the belt 13. Transfer rollers 14 are disposed inside the belt 13 to face photosensitive drums 26 of the process unit 20 over the belt 13. A sensor 15 is disposed in the vicinity of the rear support roller 12. The sensor 15 is configured to detect a test pattern to be formed on the belt 13.

The scanner unit 17 is configured to irradiate the surfaces of the photosensitive drums 26 with the corresponding lasers L emitted from a laser emitting portion (not shown).

The process unit 20 includes a frame 21, and developing cartridges 22 (e.g., four) of yellow 22Y, magenta 22M, cyan 22C, and black 22K, each of which is detachably attached to the frame 21. Each developing cartridge 22 includes a toner chamber 23 that stores toner of a corresponding one of colors, yellow, magenta, cyan, and black, a supply roller 24, and a developing roller 25. The frame 21 includes the photosensitive drums 26 and scorotron chargers 27 in association with the developing cartridges 22.

Toner discharged from the toner chamber 23 is supplied to the developing roller 25 in conjunction with the rotation of the supply roller 24, while being positively charged between the supply roller 24 and the developing roller 25 by friction. The surface of the photosensitive drum 26 rotating is uniformly charged positively by the charger 27 and exposed to the laser L that is emitted from the scanner unit 17. An electrostatic latent image corresponding to an image to be printed on a sheet 3 is formed on the surface of the photosensitive drum 26. As the developing roller 25 rotates, the toner on the developing roller 25 is supplied to the surface of the photosensitive drum 26, and the latent image is developed with the toner to form a toner image. While the recording sheet 3 passes between the photosensitive drum 26 and the transfer roller 14, the toner image is transferred to the recording sheet 3 by a transfer bias applied to the transfer roller 14.

The recording sheet 3 having the toner image thereon is fed to the fixing unit 28 by the belt unit 11, where the toner image is fixed onto the recording sheet 3 by heat. The recording sheet 3 is ejected onto an output tray 29 that is disposed at an upper surface of the body casing 2.

Figure 2:
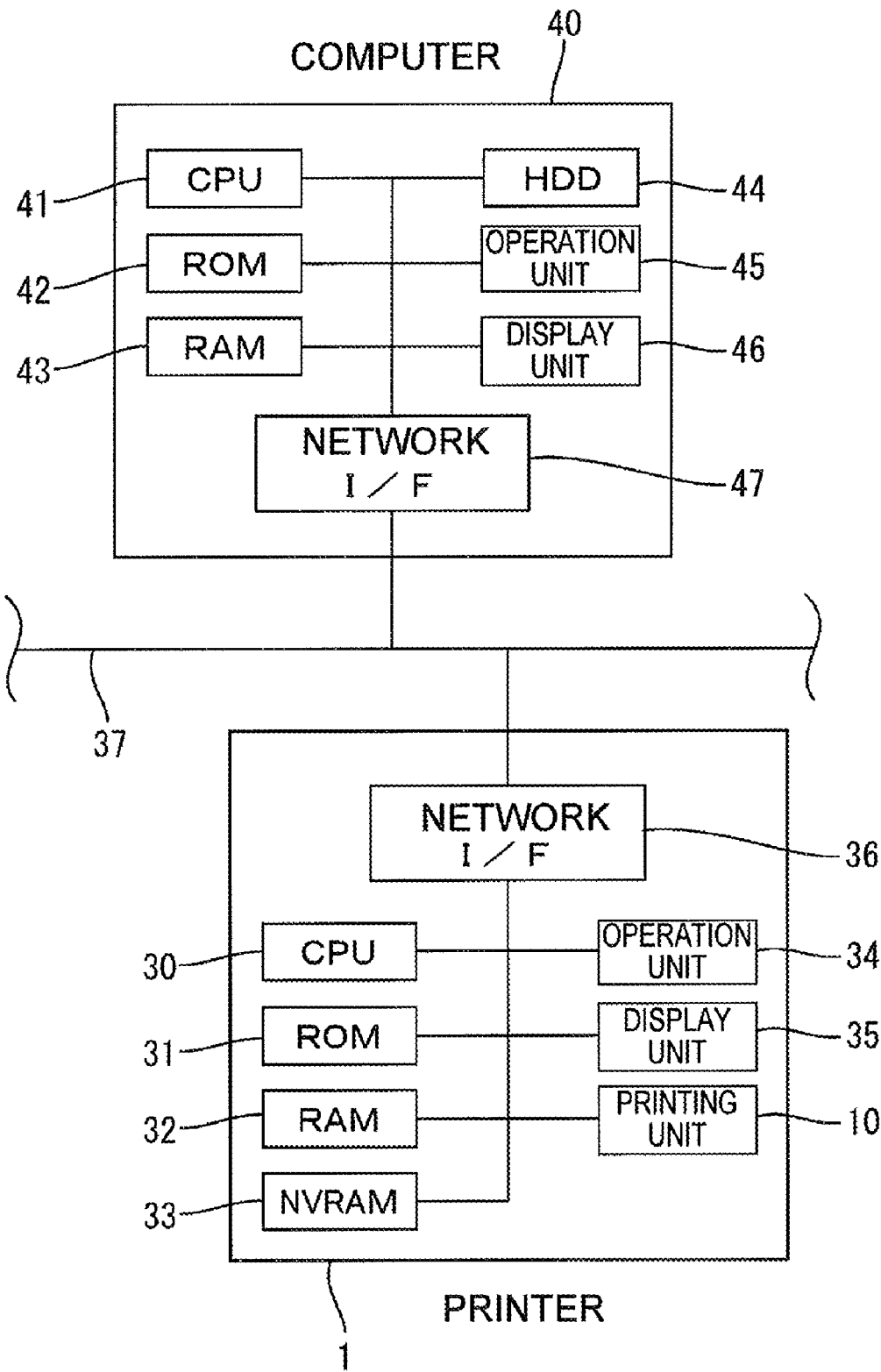
FIG. 2 is a block diagram showing an electrical structure of a printing system according to an illustrative aspect.

A printing system between the printer 1 and a computer 40 connected to the printer 1 via a communication line 37 will be described with reference to FIG. 2. Computer 40 can be connected to the printer 1 via the communication line 37.

The printer 1 may include CPU 30, ROM 31, RAM 32, non-volatile RAM (NVRAM) 33, an operation unit 34, a display unit 35, the printing unit 10, and a network interface 36.

Various programs in the form of computer executable instructions for controlling the operation of the printer 1 can be stored in the ROM 31. The CPU 30 acts as a controller and enables the RAM 32 and the NVRAM 33 to store results of processing executed according to a program read from the ROM 31, while controlling the operation of the printer 1.

The operation unit 34 includes buttons for user manipulation such as a print start button. The display unit 35 includes a liquid crystal display and a lamp, and is capable of displaying various setting screens and operation statuses. The network interface 36 is connected to the computer 40 via a communication line 37 to perform mutual data communications with the computer 40.

The computer 40 can include CPU 41, ROM 42, RAM 43, a hard disk 44, an operation unit 45 constituting a keyboard and a pointing device, a display unit 46 constituting a liquid crystal display, and a network interface 47 connected to the communication line 37. The hard disk 44 stores various programs having computer executable instructions such as application software for creating print data and printer drivers.

Figure 3:
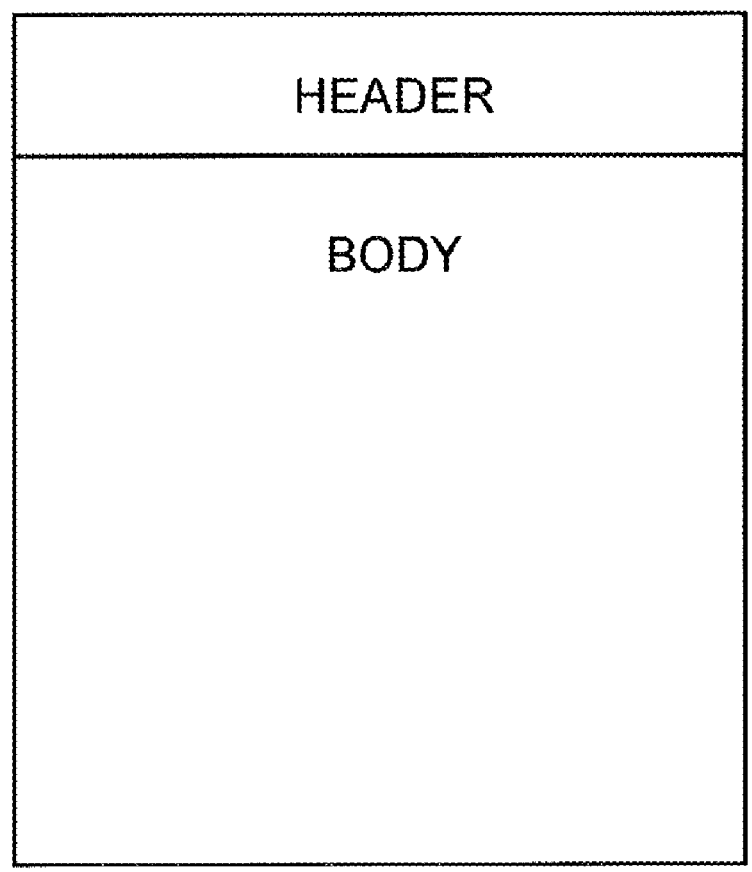
FIG. 3 illustrates a print data structure according to an illustrative aspect.

When the user inputs a print command to the computer 40 through the operation unit 45, the CPU 41 causes application software to create data for printing, and causes a printer driver to convert the data into a page description language (PDL) to create print data shown in FIG. 3.

The print data may have a data structure including a header section and a body section. Image data to be printed may be contained in the body section. The header section includes a print request (command) with an IP address of the computer 40 that is a source, and an IP address of the printer 1 that is a destination. The header further includes information such as a date of the print request, a user name, a document name, an application name, a data type, the number of pages, and the number of colors on each page (namely, color printing or monochrome printing). The CPU 41 sends the print data to the printer 1 via the network interface 47.

Figure 4:
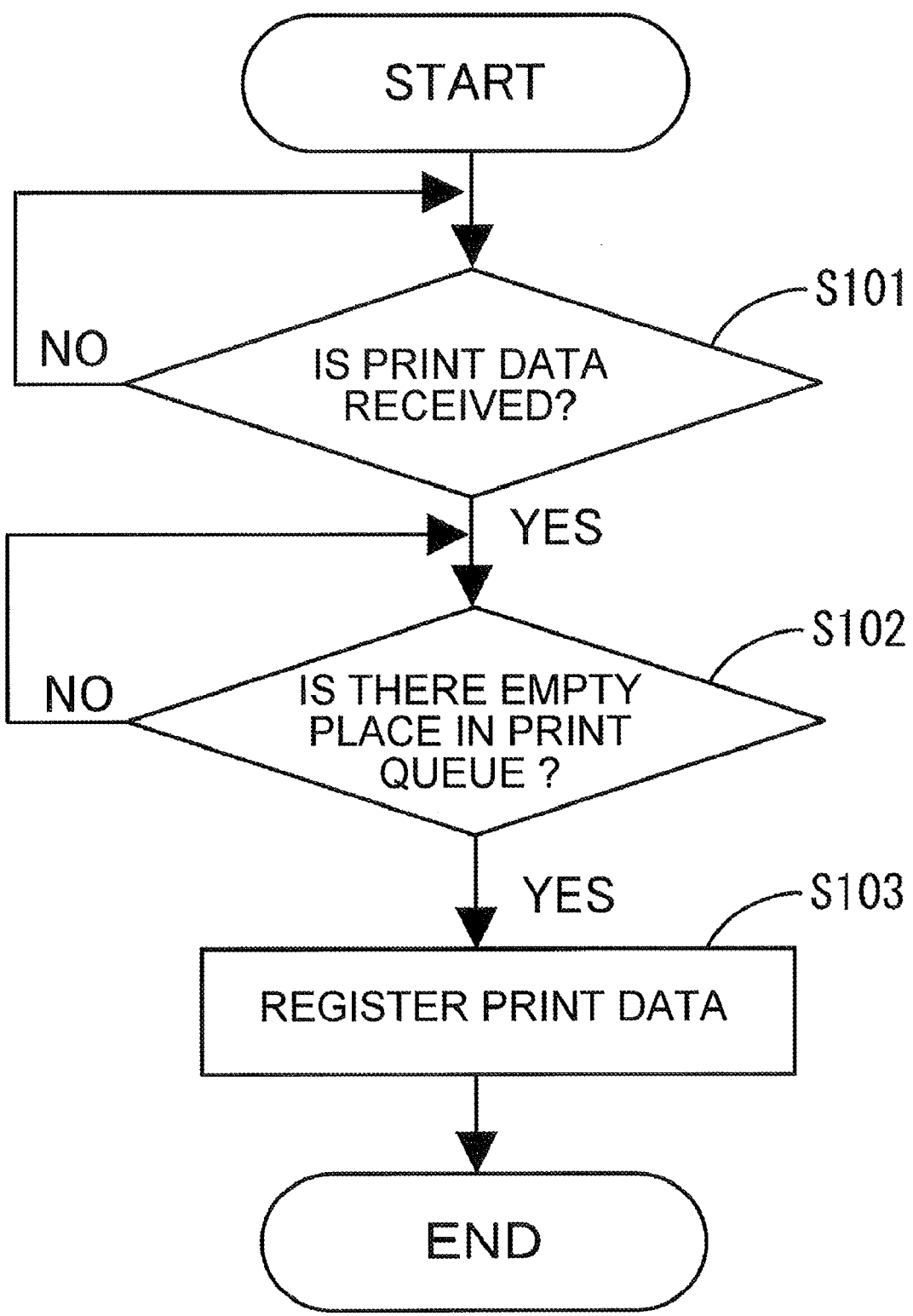
FIG. 4 is a flowchart of a job registration procedure according to an illustrative aspect.
Figure 5:
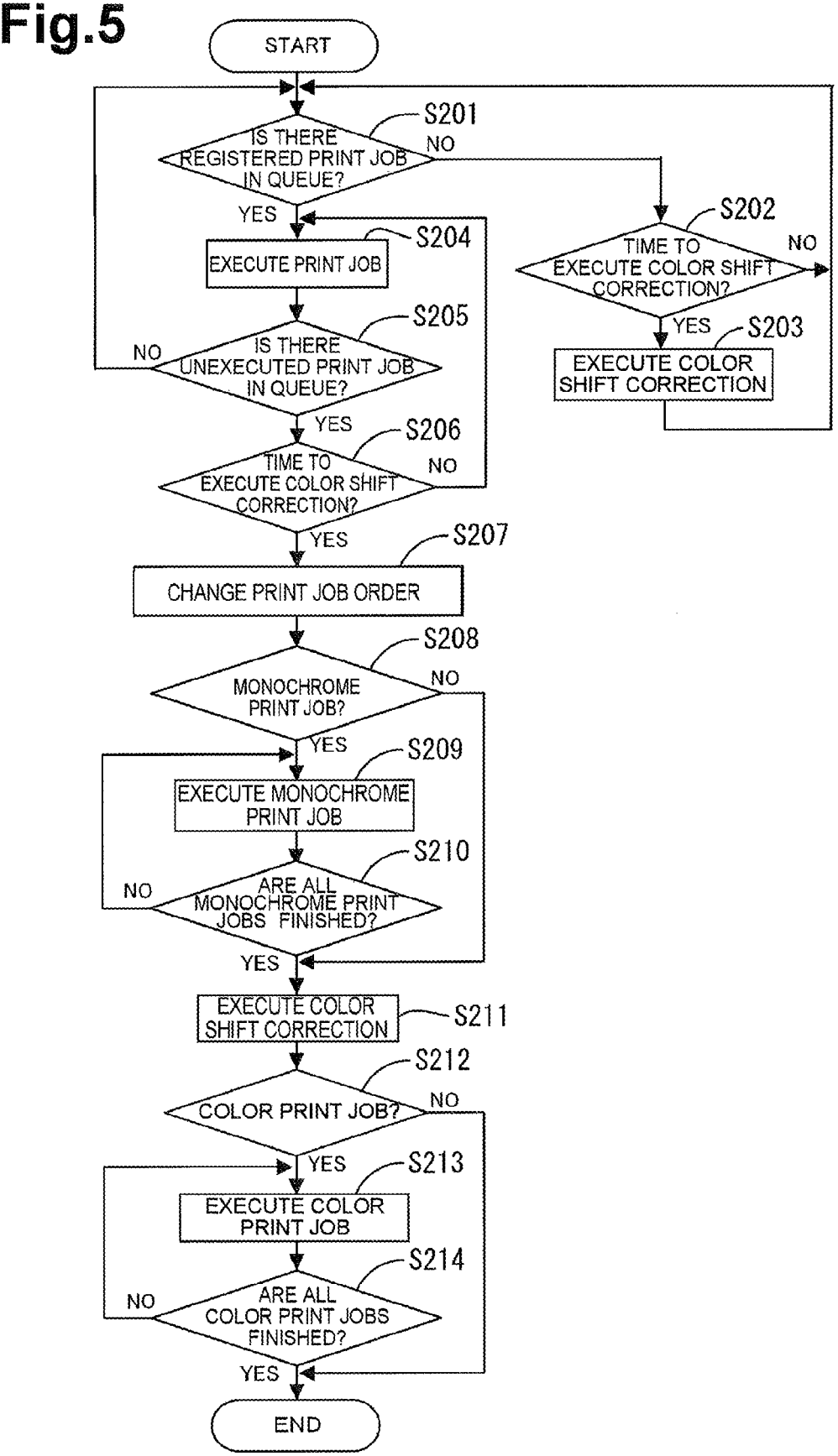
FIG. 5 is a flowchart of printing processing according to an illustrative aspect.

When the printer 1 is turned on and becomes ready to print, the CPU 30 of the printer 1 starts a job registration processing (FIG. 4) and printing processing (FIG. 5). In the job registration processing, as shown in FIG. 4, the CPU 30 regularly monitors reception of the print data (print request) (S101). When the CPU 30 receives the print data and stores it in the RAM 32 (S101: Yes), it determines whether there is an empty place in a print queue (S102). The print queue is a data structure for determining the order of execution of print jobs and is stored in the RAM 32 by the CPU 30. Several print jobs (up to six jobs in this illustrative embodiment) can be registered in the print queue. The print jobs are numbered in order received from one. When there is an empty place in the print queue (S102: Yes), the CPU 30 registers the received print data in the print queue as a print job (S103). The print job registered at this time is ranked last.

In the printing processing, as shown in FIG. 5, the CPU 30 determines whether there is a registered print job in the print queue (S201). When there is no registered print job (S201: No), the CPU 30 determines whether a flag indicating time to execute a color shift correction (as an example of the calibration) is turned on (S202). The flag indicating the time to execute the color shift correction is stored in the NVRAM 33. Although the value of the flag is normally off, it is turned on by the CPU 30 in advance when certain conditions are detected, such as when a fixed time elapses after the previous color shift correction, when designated pages are printed after the previous color shift correction, when the environment (e.g., temperature) changes, or when the remaining amount of toner is changed. The determination as to whether it is the time to execute the color shift correction may be made on reception of print data according to the status of the printer 1. Records, such as a period of time elapsed after the previous color shift correction or the number of pages to be printed after the previous color shift correction, are stored in the NVRAM 33 and will not disappear even when the power is turned off.

When the flag is off or it is still not time to execute color shift correction (S202: No), the flow returns to S201 and repeats S201 and S202 until a print job is registered in the print queue or the flag of the color shift correction is turned on. When the flag is on, that is, when it is the time to execute the color shift correction (S202: Yes), the CPU 30 executes color shift correction (S203) and returns the flag to off. In this color shift correction, a test pattern of each color is printed on the belt 13 by the scanner unit 17 and the process unit 20, the position of the test pattern is measured by the sensor 15 to find an amount of deviation from a transfer position by each color, and adjustments, e.g. exposure timing by the scanner unit 17 or exposure position on the photosensitive drum 26, are made. After the color shift correction, the flow returns to S201.

When there is a registered print job or are registered print jobs in the print queue at S201 (S201: Yes), a printing process for the first print job ranked in the print queue is executed (S204). In this printing process, print data stored in the RAM 32 is subjected to image processing, for example, by converting the print data into bitmap data, and the bitmap data is sent to the printing unit 10 to perform printing. After printing is performed, the print job is deleted from the print queue, and print jobs remaining in the print queue are moved up one in the order. The CPU 30 determines whether there is an unexecuted print job in the print queue (S205). When there is no unexecuted print job (S205: No), the flow returns to S201.

When there is an unexecuted print job in the print queue (S205: Yes), the CPU 30 determines whether it is the time to execute the color shift correction based on the value of the flag described above (S206). When it is not the time to execute the color shift correction (S206: No), the flow returns to S204 and the CPU 30 executes the subsequent print job that is the first in the current order in the print queue. While it is not the time to execute the color shift correction, print jobs registered in the print queue are executed successively.

When the flag indicating the time to execute color shift correction is on (S206: Yes), the CPU 30 changes the order of the print jobs registered in the print queue (S207). In the order change process, the print jobs in the print queue are grouped into color print jobs and monochrome print jobs based on the headers of print data. A print job in which a color page is included in the print data is regarded as a color print job. A print job in which all pages in the print data are to be printed using only one color is regarded as a monochrome print job.

The print jobs are sorted in the order that each monochrome print job is higher than color print jobs in the order in the print queue. For example, as shown in FIG. 6, six print jobs A to F are registered in a print queue. Before the job order is changed (on the left side of FIG. 6), the numbers 1, 4, and 6 are assigned to color print jobs A, D, and F, respectively, and the numbers 2, 3, and 5 are assigned to monochrome print jobs B, C, and E, respectively. After the job order is changed (on the right side of FIG. 6), the numbers 1, 2, and 3 are assigned to monochrome print jobs B, C, and E, respectively, and the numbers 4, 5, and 6 are assigned to color print jobs A, D, and F, respectively.

The CPU 30 determines whether the subsequent print job, that is, the current first print job in the print queue, is a monochrome print job (S208). When it is a monochrome print job (S208: Yes), the CPU 30 executes the print job (S209) and then deletes it from the print queue. The CPU 30 determines whether all monochrome print jobs in the print queue are finished (whether the subsequent print job is a monochrome print job) (S210): When all monochrome print jobs are not finished (S210: No), the flow returns to S209 and the CPU 30 executes the subsequent monochrome print job.

When all monochrome print jobs in the print queue are finished (S210: Yes) or there are no monochrome print jobs in the print queue (S208: No), the CPU 30 executes color shift correction (S211) and returns the flag to off.

The CPU 30 determines whether the subsequent print job, that is, the current first print job in the print queue, is a color print job (S212). When it is a color print job (S212: Yes), the CPU 30 executes the print job (S213) and then deletes it from the print queue. The CPU 30 determines whether all color print jobs are finished (or the subsequent print job is a color print job) (S214). When all color print jobs are not finished (S214: No), the flow returns to S213 and the CPU 30 executes the subsequent color print job.

When all color print jobs in the print queue are finished (S214: Yes) or there is no color print job in the print queue (S212: No), the printing processing is finished, and the job registration processing is restarted.

According to the above illustrative embodiment, when the CPU 30 determines that it is the time to execute the color shift correction (an example of calibration), it executes printing of monochrome print job(s) in the print queue first, executes the color shift correction, and then executes printing of color print job(s), if the print queue includes both monochrome and color print jobs. As the monochrome print jobs, which are less susceptible to the color shift correction, are printed in preference to the color print jobs, waiting time due to the color shift correction can be avoided. As to the color print jobs, printing is performed after the color shift correction, so that print quality can be secured.

While color printing is performed with different color toners, e.g., magenta, yellow, cyan, and black, monochrome printing is performed with one of the different color toners. Printing of a monochrome print job(s) on a priority basis can avoid generating waiting time due to the calibration.

In the above illustrative embodiment, color shift correction is performed as an example of calibration. Aspects of the invention may be applied to a correction of other print characteristic, e.g., a density correction. The density correction may be performed by printing test patterns or patches on a belt, measuring densities of the test patterns by a sensor and adjusting the density based on measured results.

In the above illustrative embodiment, although a color laser printer of direct-transfer type is illustrated as an illustrative printing apparatus, a laser printer of intermediate transfer type may be applied. Alternatively, an inkjet printer may be applied.

At the time to execute the calibration, a notification that the order of print jobs is changed may be delivered to a computer that is a source of the print jobs. Alternatively, an instruction whether to perform the print job order change or whether to perform calibration may be input by a user, so that processing may be done in accordance with the input.

While the features herein have been described in connection with various example structures and illustrative aspects, it will be understood by those skilled in the art that other variations and modifications of the structures and aspects described above may be made without departing from the scope of the invention. Other structures and aspects will be apparent to those skilled in the art from a consideration of the specification or practice of the features disclosed herein. It is intended that the specification and the described examples only are illustrative with the true scope of the inventions being defined by the following claims.

What is claimed is:

1. A printing apparatus comprising:
   memory configured to store a plurality of print jobs;
   a printing device configured to print an image based on each of the print jobs;
   a detector configured to determine when it is time to execute calibration to correct a printing characteristic of the printing device; and
   a controller configured to
      cause the printing device to print each monochrome print job stored in the memory prior to each color print job stored in the memory when the detector determines that it is time to execute the calibration,
      execute the calibration responsive to the detector determining that it is time to execute the calibration, and
      cause the printing device to print each color print job stored in the memory after executing the calibration.

2. The printing apparatus according to claim 1, wherein the memory is configured to store print data received from an information processing device as a print job and the controller is configured to delete a print job which is executed by the printing device.

3. The printing apparatus according to claim 1, wherein the printing device is configured to perform color printing using a plurality of different coloring agents and perform monochrome printing using one of the coloring agents.

4. A non-transitory computer-readable medium having computer-executable instructions stored thereon for controlling a printing process, which when executed by a computer, performs a method comprising:
   registering print jobs in a print queue;
   causing the print jobs in the print queue to be printed;
   determining that it is time to execute calibration to correct a printing characteristic;
   causing any monochrome print job in the print queue to be printed prior to any color print job remaining in the print queue responsive to determining that it is time to execute calibration;
   causing calibration to be executed responsive to determining that it is time to execute calibration; and
   responsive to determining that it is time to execute calibration, causing any color print job remaining in the print queue to be printed once calibration has been executed.

5. The computer readable medium of claim 4, wherein the method further includes:
   responsive to determining that it is time to execute calibration, causing any monochrome print job in the print queue to be printed prior to causing calibration to be executed.

6. The computer readable medium of claim 4, wherein determining that it is time to execute calibration includes determining that a fixed time has elapsed since a prior calibration or determining that a set number of printing operations has been executed.

7. The computer readable medium of claim 4, wherein determining that it is time to execute calibration includes detecting an environmental change.

8. The computer readable medium of claim 4, wherein the method further includes receiving print status data, wherein determining that it is time to execute calibration is based on the print status data.

9. A computer-implemented method for controlling a printing process comprising:
    registering print jobs in a print queue;
    causing the print jobs in the print queue to be printed;
    determining that it is time to execute calibration to correct a printing characteristic;
    causing any monochrome print job in the print queue to be printed prior to any color print job remaining in the print queue responsive to determining that it is time to execute calibration;
    causing calibration to be executed responsive to determining that it is time to execute calibration; and
    responsive to determining that it is time to execute calibration, causing any color print job remaining in the print queue to be printed once calibration has been executed.

10. The computer-implemented method of claim 9, further including
    responsive to determining that it is time to execute calibration, causing any monochrome print job in the print queue to be printed prior to causing calibration to be executed.

11. The computer-implemented method of claim 9, wherein determining that it is time to execute calibration includes determining that a fixed time has elapsed since a prior calibration or determining that a set number of printing operations has been executed.

12. The computer-implemented method of claim 9, wherein determining that it is time to execute calibration includes detecting an environmental change.

13. The computer-implemented method of claim 9, further including receiving print status data, wherein determining that it is time to execute calibration is based on the print status data.

* * * * *